US010186038B1

(12) United States Patent
Kluckner et al.

(10) Patent No.: US 10,186,038 B1
(45) Date of Patent: Jan. 22, 2019

(54) SEGMENTATION AND REPRESENTATION NETWORK FOR POSE DISCRIMINATION

(71) Applicant: Siemens Healthcare GmbH, Erlangen (DE)

(72) Inventors: Stefan Kluckner, Berlin (DE); Vivek Kumar Singh, Princeton, NJ (US); Shanhui Sun, Princeton, NJ (US); Oliver Lehmann, Princeton, NJ (US); Kai Ma, West Windsor, NJ (US); Jiangping Wang, Plainsboro, NJ (US); Terrence Chen, Princeton, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 15/652,593

(22) Filed: Jul. 18, 2017

(51) Int. Cl.
*G06T 7/11* (2017.01)
*G06K 9/36* (2006.01)

(52) U.S. Cl.
CPC ...... *G06T 7/11* (2017.01); *G06T 2207/10028* (2013.01); *G06T 2207/20081* (2013.01); *G06T 2207/20084* (2013.01); *G06T 2207/30244* (2013.01)

(58) Field of Classification Search
None
See application file for complete search history.

(56) References Cited

U.S. PATENT DOCUMENTS

| 9,524,582 | B2 | 12/2016 | Ma et al. | |
|---|---|---|---|---|
| 2017/0011555 | A1* | 1/2017 | Li | G06T 1/60 |
| 2018/0060701 | A1* | 3/2018 | Krishnamurthy | G06K 9/6269 |
| 2018/0144458 | A1* | 5/2018 | Xu | G06T 7/004 |
| 2018/0211099 | A1* | 7/2018 | Ranjan | G06K 9/00248 |

OTHER PUBLICATIONS

Long, Jonathan et al., "Fully Convolutional Networks for Semantic Segmentation", Computer Vision and Pattern Recognition, 2015, 10pgs.
Liong, Venice Erin et al. "Deep Hashing for Compact Binary Codes Learning", 2015, Computer Vision Foundation, IEEE Explore, (pp. 2475-2483, 8 pages total).

(Continued)

*Primary Examiner* — Sumati Lefkowitz
*Assistant Examiner* — David Perlman

(57) ABSTRACT

A system and method includes creation of a combined network comprising an image segmentation network and an image representation network, the combined network to generate an image descriptor based on an input query image, training of the combined network based on a plurality of first images and a segmentation mask associated with each of the plurality of first images, reception of a first input query image, use of the combined network to generate an image descriptor based on the first input query image, determination of a matching image descriptor from a plurality of stored image descriptors, determination of a camera pose associated with the matching image descriptor, registration of the first input query image with image data based on the determined camera pose, generation of a composite image based on the registered first input query image and image data, and presentation of the composite image.

14 Claims, 11 Drawing Sheets

(56) References Cited

OTHER PUBLICATIONS

LeCun, Y. et al., "LeNet-5, convolutional neural networks", Proceedings of the IEEEE, Nov. 1998, Retrieved rom http://yann.lecun.com/exdb/lenet, downloaded on Jun. 28, 2017, 3pgs.

Wohlhart, Paul et al., "Learning Descriptors for Object Recognition and 3D Pose Estimation", Institute for Computer Vision and Graphics, 2015, 2pgs.

\* cited by examiner

US 10,186,038 B1

SEGMENTATION AND REPRESENTATION NETWORK FOR POSE DISCRIMINATION

BACKGROUND

Depth cameras are used in many applications, including but not limited to gaming, manufacturing and medical imaging. Conventional depth cameras provide the ability to acquire a detailed representation of a scene in a compact and easy-to-implement manner. From a single stationary position, a depth camera acquires image data which consists of a two-dimensional image (e.g., a two-dimensional RGB image, in which each pixel is assigned a Red, a Green and a Blue value), and a depth image, in which the value of each pixel corresponds to a depth or distance of the pixel from the depth camera. This image data, consisting of a two-dimensional image and a depth image, will be referred to herein as a two-dimensional depth image.

It is often desirable to register two-dimensional depth images with one another. Registration may facilitate the association of portions of a two-dimensional depth image with features of a corresponding model of an imaged object, the tracking of an imaged object through multiple successively-acquired two-dimensional depth images, and many other use cases.

An object of interest may be embedded in a cluttered environment, such as an operating/examination room or a production floor, and two-dimensional depth images thereof may therefore include many background structures. These structures hinder the ability to identify the object of interest and perform accurate registration of the two-dimensional depth image with other image data (e.g., a computer-aided design (CAD) model) of the object.

DETAILED DESCRIPTION

The following description is provided to enable any person in the art to make and use the described embodiments and sets forth the best mode contemplated for carrying out the described embodiments. Various modifications, however, will remain apparent to those in the art.

Figure 1:
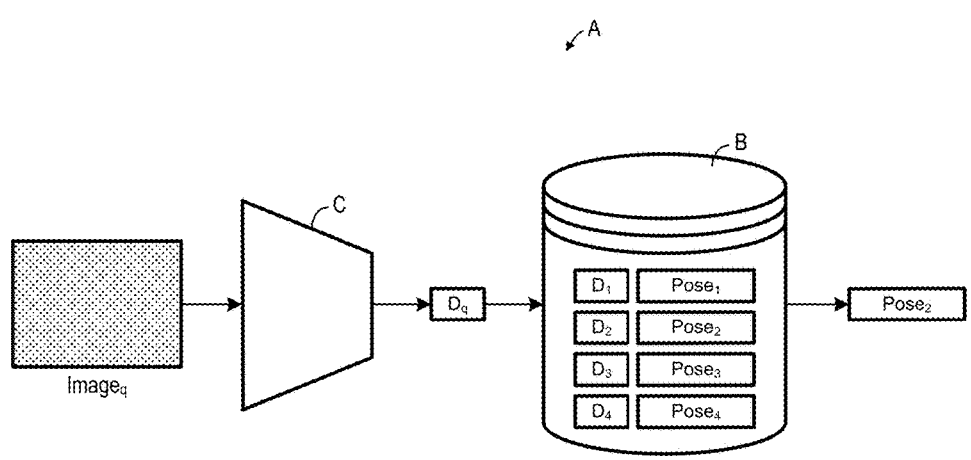
FIG. 1 is a block diagram of a system to determine a camera pose.

FIG. 1 illustrates system A for determining a camera pose associated with an input query image $image_q$. $Image_q$ is an image of an object, and a camera pose is a position at a particular distance vector and orientation with respect to the object. The camera pose associated with $image_q$ is therefore the position and orientation of a hypothetical camera which captured $image_q$. By knowing the camera pose, $image_q$ can be registered against other image data of the object, such as a CAD drawing.

System A uses database B, which was pre-populated with descriptors generated from each of many images of the object, where each image represents a different camera pose. Each descriptor is stored in association with the camera pose represented by the image from which the descriptor was generated. The different images may be rendered from a three-dimensional CAD model of the object as is known, and the descriptors may be generated by descriptor network C.

In operation, descriptor network C generates descriptor $D_q$ based on $Image_q$. In the present example, it is assumed that descriptor $D_q$ most closely resembles descriptor $D_2$ of database B. Since descriptor $D_2$ is associated with pose $Pose_2$ in database B $Pose_2$ is output. As described above, system A is susceptible to errors caused by background structures present within $image_q$.

According to some embodiments, a compact representation (e.g., a descriptor) of an image is generated which is primarily influenced by foreground elements of the image. A network according to some embodiments includes a trained segmentation network to segment an image into a foreground region of interest, and a trained representation network to generate a representation based on the segmented image. The representation enables an efficient identification of a camera pose using a database which associates such representations with corresponding camera poses.

Figure 2:
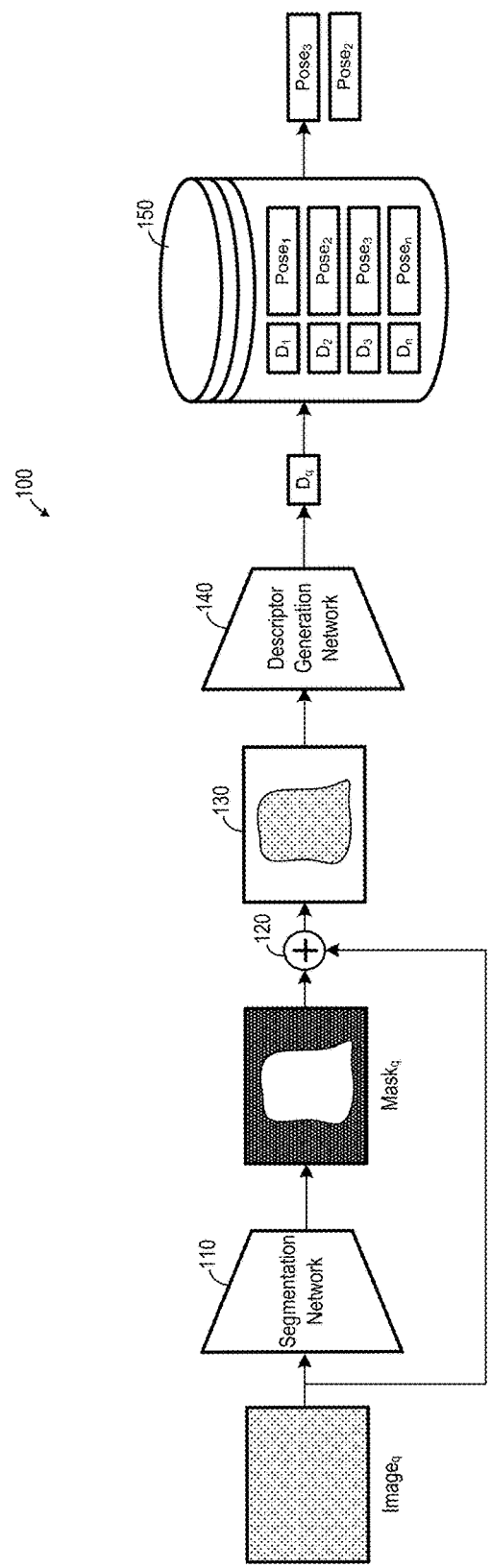
FIG. 2 is a block diagram illustrating a system to determine a camera pose according to some embodiments.

FIG. 2 illustrates system 100 according to some embodiments. Again, the goal of system 100 is to determine a camera pose based on input image $image_q$. Segmentation network 110 receives image $image_q$ and generates $mask_q$ based thereon. $Mask_q$ is intended to distinguish between the foreground and background of image $image_q$. Segmentation masks as described herein are not necessarily binary and may comprise a likelihood map where each pixel stores the probability of that pixel being a foreground or background pixel. Training of segmentation network 110 to achieve this function will be described in detail below.

Operator 120 applies $mask_q$ to $image_q$ to generate masked image 130. According to some embodiments, image 130 primarily includes one or more foreground objects of interest. Image 130 is received by descriptor generation network 140, which generates descriptor Dq based thereon. Training of descriptor generation network 140 according to some embodiments will be described below.

Descriptor $D_q$ is compared against the descriptors of database 150 to determine a match. Generation of database 150 according to some embodiments will be described below. In the illustrated example, matches are determined with descriptors $D_3$ and $D_2$, with descriptor $D_3$ being a "closer" match. Accordingly, system 100 outputs $Pose_3$ and $Pose_2$, the camera poses associated with the determined descriptors. As described above, a determined camera pose may be used to register other image data (presumably of an object depicted in $image_q$) with $image_q$.

Figure 3:
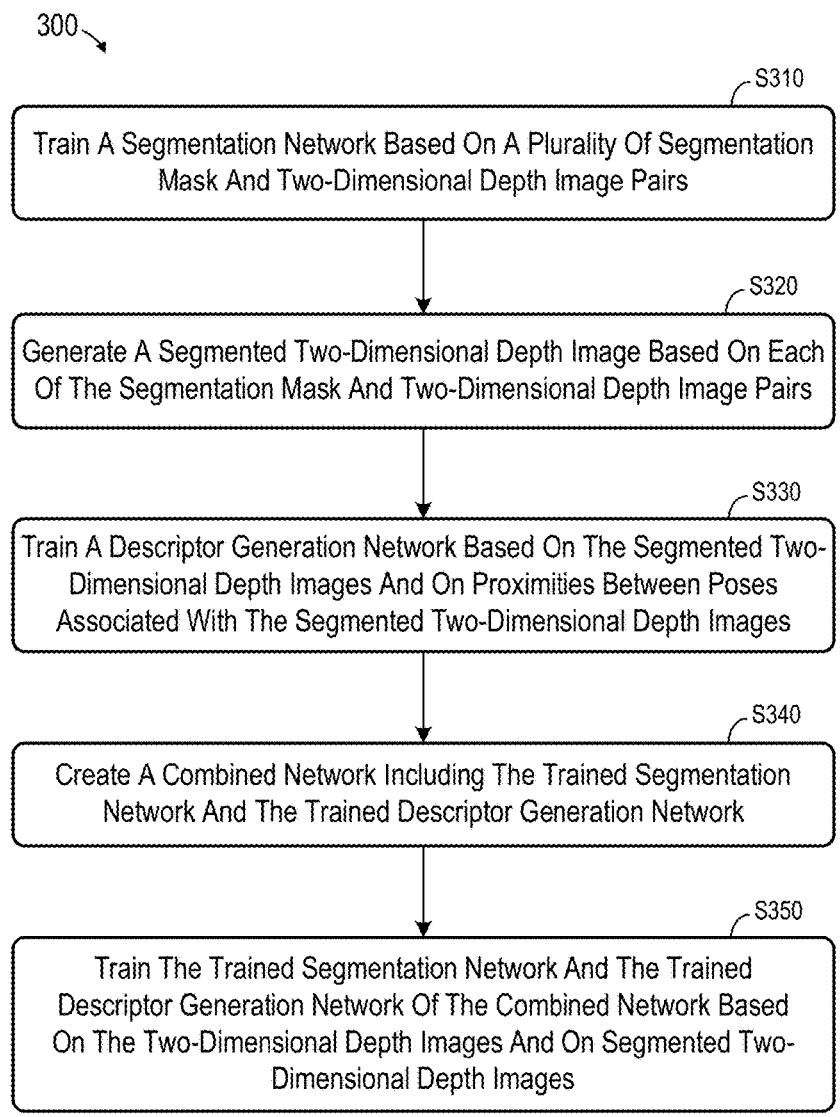
FIG. 3 is a flow diagram of a process to create a combined image segmentation and representation network according to some embodiments.

FIG. 3 is a flow diagram of process 300 according to some embodiments. Process 300 and the other processes described herein may be performed using any suitable combination of hardware, software or manual means. Software embodying these processes may be stored by any non-transitory tangible medium, including a fixed disk, a floppy disk, a CD, a DVD, a Flash drive, or a magnetic tape. Embodiments are not limited to the examples described below.

According to some embodiments, two networks are trained to perform image segmentation and representation. In order to avoid local minima and for weight initialization, one of the networks is trained separately for segmentation and the other network is trained separately for representation (i.e., generation of a representation of an image). The trained networks are combined to learn segmentation and representation jointly using two different loss functions.

Figure 4:
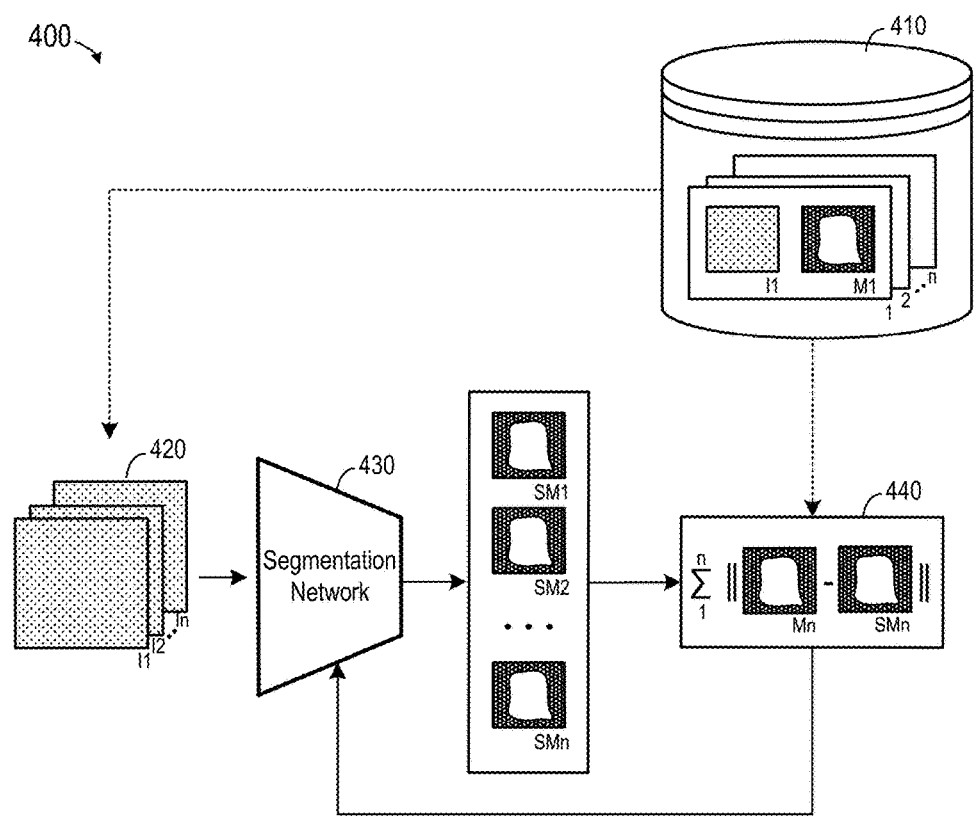
FIG. 4 is a diagram illustrating training of a segmentation network according to some embodiments.

Referring to process 300, a segmentation network is trained at S310 based on a plurality of segmentation mask and two-dimensional depth image pairs. FIG. 4 is a block diagram illustrating system 400 to perform S310 according to some embodiments. System 400 includes database 410 storing pairs of two-dimensional depth images I1 through In and associated masks M1 through Mn.

Segmentation network 430 is configured to generate a foreground mask based on a received image. To train segmentation network 430, images I1 through In are each processed by segmentation network 430 in order to generate a respective mask SMn corresponding to each image. Loss layer 440 determines the cumulative difference between each generated mask SMn and its corresponding "ground truth" mask Mn. Segmentation layer 430 is modified based on the cumulative difference as is known in the art, and the process repeats until the cumulative difference is below a threshold or some other criteria (e.g., number of iterations) is met.

Segmentation network 430 may implement a fully convolutional network architecture which performs a semantic segmentation on pixel level for the entire image domain. The first part of network 430 may be similar to an AlexNet structure, but embodiments are not limited thereto. The second part of network 430 may include a deconvolution step where individual responses are up-sampled to full image resolution. A cross-entropy loss function, aggregated over the pixels, may be used to optimize the segmentation mask based on the input information. Alternatively, segmentation network 430 may implement an encoder-decoder network, such as but not limited to SegNet: A Deep Convolutional Encoder-Decoder Architecture for Image Segmentation.

The training data of database 410 may be generated by rendering two-dimensional depth images from three-dimensional CAD data of an object which is intended to be imaged, such as a piece of equipment. Rendering quality and characteristics should correspond to the quality and characteristics (e.g. the noise model and reconstruction process) of the sensor type of the depth camera which is expected to be used.

Figure 5:
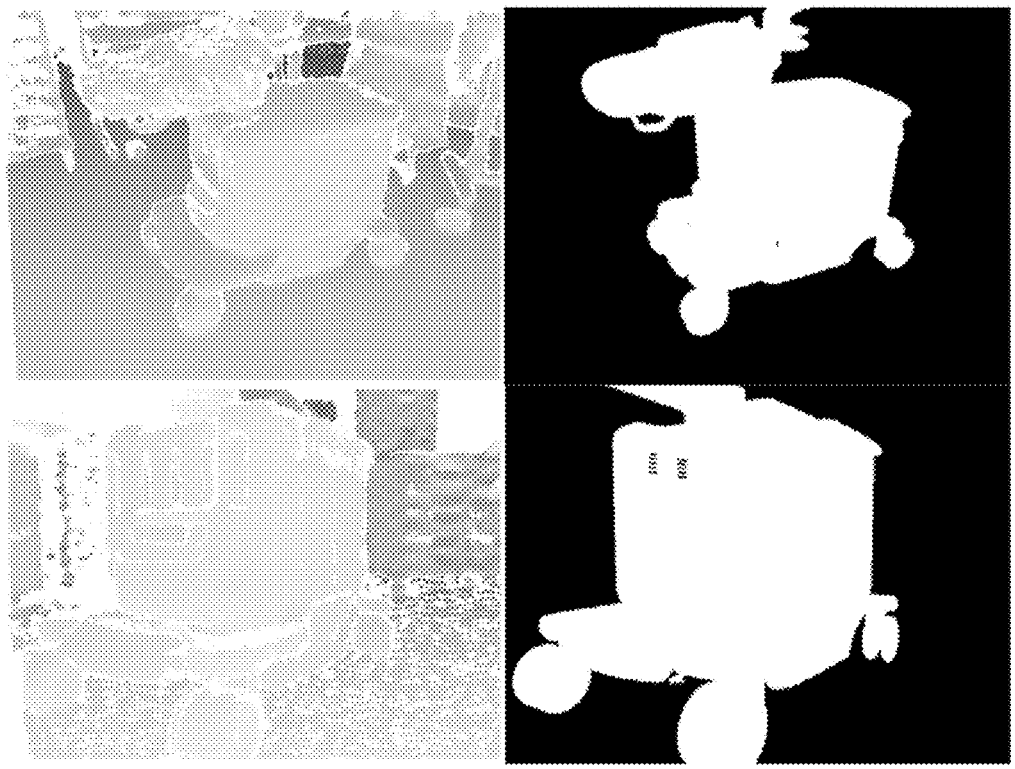
FIG. 5 illustrates pairs of images and segmentation masks according to some embodiments.

The two-dimensional depth images of the training data may include random objects in the scene to simulate various realistic setups. Typically, background structures are further away from the camera than the objects of interest in the foreground. A foreground mask Mn is also generated for each training image In. According to some embodiments, each training image is rendered from a same camera pose twice; without background structures and with background structures. A binary segmentation mask may be generated on the pixel level from these two renderings. To increase robustness to background structures, several masks be generated for a same camera pose using images including different background arrangements. FIG. 5 shows two rendered two-dimensional depth images including background data (left) and their corresponding binary segmentation masks (right) generated according to some embodiments.

The generated depth images may be rendered over an expected space of camera poses. For example, the virtual camera poses used for rendering are located in a realistic way to simulate the target scenario (e.g., how a user, a moving vehicle or a static camera may observe the scene). According to some embodiments, virtual camera poses are derived from prior information, such as from a real test scenario in which an operator is asked to capture images as it would be performed during an inspection task. Similar poses can be generated based on this reconstructed prior and augmented by perturbations.

In some embodiments, many potential virtual camera poses are determined. Based on defined requirements such as minimal and maximum distance, visibility of particular parts, etc., invalid poses may be identified and discarded from the final view prior to computation. Prior information may be introduced to reduce the search space based on the expected camera setup.

Figure 6:
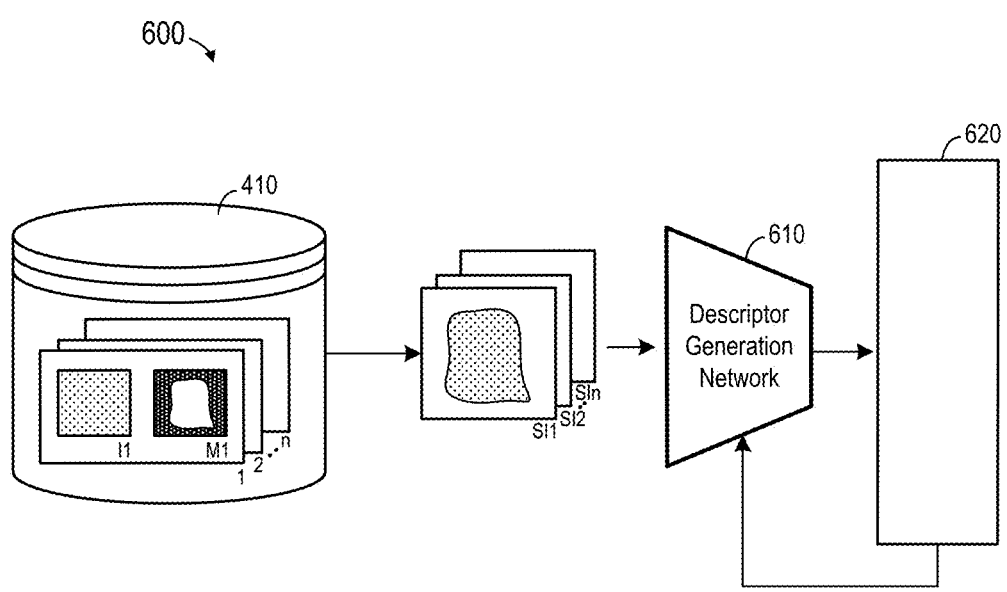
FIG. 6 is a diagram illustrating training of a descriptor generation network according to some embodiments.

At S320, a segmented two-dimensional depth image is generated based on each segmentation mask and two-dimensional depth image pair. FIG. 6 illustrates the above-described training data of database 410. In some embodiments of S320, each mask is applied to its paired image to result in corresponding segmented images SIn.

Next, at S330, a descriptor generation network is trained based on the segmented two-dimensional depth images and on proximities between poses associated with the segmented two-dimensional depth images. Training initially consists of generating an m-dimensional descriptor for each input segmented image.

Sampling/loss layer 620 samples several triplets consisting of a descriptor of a first segmented image representing a first camera pose, a descriptor of a second segmented image known to represent a camera pose which is similar in location and/or orientation to the first camera pose, and a descriptor of a third segmented image known to represent a camera pose which is dissimilar in location and/or orientation to the first camera pose. These relative proximities are known and may be determined from training data of database 410. Similarities and dissimilarities in camera poses may be based on spatial distance in camera position, overlap scoring of image content, distance computations taking into account the six degrees of freedom of the camera pose space, etc.

Sampling/loss layer 620 evaluates each triplet to ensure that the descriptors of the first and second segmented images are "closer" to each other in the m-dimensional space than the descriptors of the first and third segmented images. This evaluation may comprise evaluation of a loss function (e.g., $\Sigma_{\forall x} L(x, p(x), n(x))$, and layer 620 back-propagates the determined loss to descriptor generation network 610 to minimize the loss. The foregoing iterates until the loss reaches an acceptable level, at which point descriptor generation network 610 is considered trained. According to some embodiments, the loss function is represented as:

$$L = L_{triplet} + L_{pairwise} + \lambda |w|_2^2$$

where $L_{triplet}$ denotes the triplet loss function and $L_{pairwise}$ represents the pairwise loss function. The third term is a regularization term to enforce a smooth solution. A triplet is defined as $((\pi, \pi_+, \pi_-)$, where $\pi$ is one camera pose sampling point, $\pi_+$ is a camera pose close to pose $\pi$, and $\pi_-$ is not close to pose $\pi$.

Figure 7:
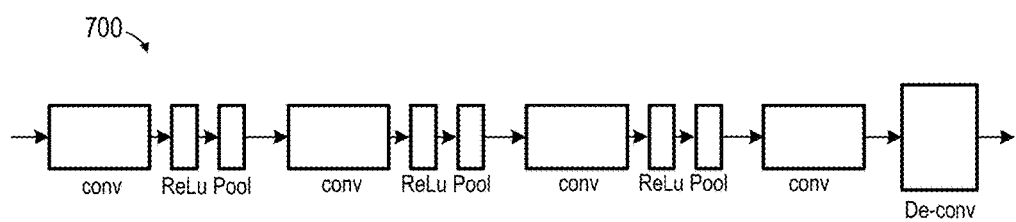
FIG. 7 illustrates a segmentation network according to some embodiments.
Figure 8:
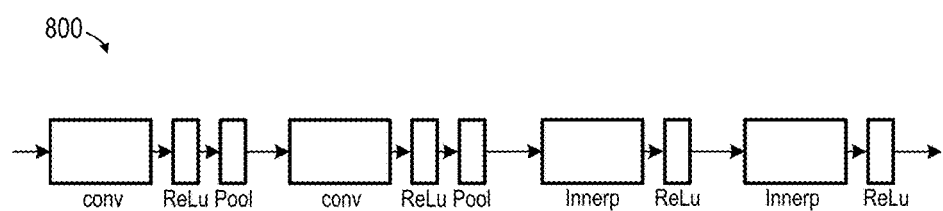
FIG. 8 illustrates a descriptor generation network according to some embodiments.

FIG. 7 illustrates an implementation of a segmentation network according to some embodiments, and FIG. 8 illustrates an implementation of a descriptor generation network according to some embodiments. After each convolution layer and full connected layer, a ReLu layer is also applied. The output layer is a group of nodes which are fully connected to the previous layer.

In some embodiments, each network's task (i.e., segmentation or representation) could be handled as a (1) classification problem where each pose defines a particular object class or (2) as a data reconstruction problem where the input is abstracted to unique signatures. Approach (2) is described herein as it may exhibit better scaling capabilities with high numbers of potential virtual viewpoints.

At S340, a combined network is created including the trained segmentation network and the trained descriptor generation network. Next, at S350, the trained segmentation network and the trained descriptor generation network of the combined network are trained based on the two-dimensional depth images and on segmented two-dimensional depth images.

According to some embodiments, the combined training at S350 benefits the learning of a robust representation (i.e., descriptor) which is suitably invariant to background structures. Difficulties in the representation problem may be addressed by the segmentation network and errors in the segmentation problem may be compensated by the representation network.

Figure 9:
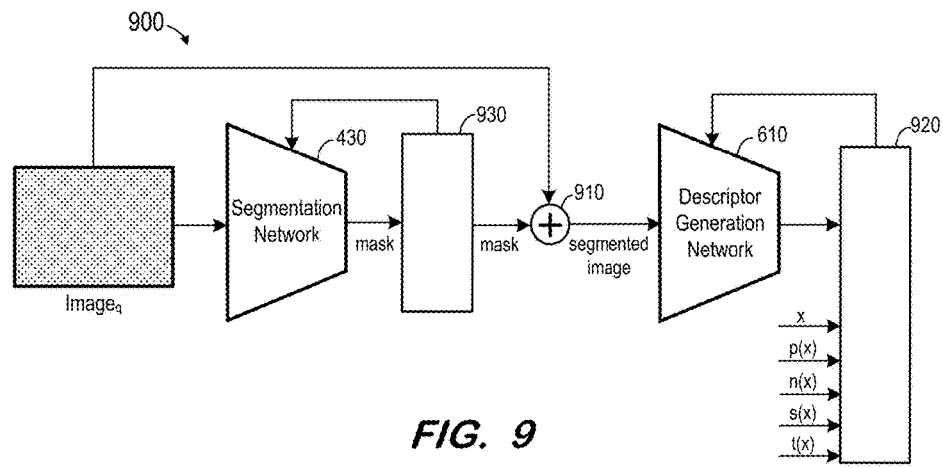
FIG. 9 illustrates fine-tuning of a combined segmentation and representation network according to some embodiments.

FIG. 9 illustrates combined network 900 according to some embodiments. As shown, a known image$_q$ is passed through segmentation network 430 to generate a mask as described above and a segmented image is obtained by element-wise operation 910 on the query image and the mask. Descriptor generation network 610 generates a descriptor x based on the segmented image and uses pre-segmented triplet image pair p(x) ("close" descriptor), n(x) ("far" descriptor) and pre-segmented "close" image s(x) and t(x) to generate a loss term which back-propagates to fine-tune network 610 to segmentation errors in the query image. The segmentation loss is also determined and back-propagated to segmentation network 430 by layer 930 as described above to improve segmentation network 430 as well.

System 900 may be beneficial in a use case in which the representation is to be used to match against a database of segmented images as described above. In some embodiments, the segmented query image can also be passed along a pair1 stream with its ground truth segmented image as a pair2 stream. This arrangement enforces the regularization loss term to further emphasize the network to map the ground truth segmented image and noisy segmented image to a similar representation.

Figure 10:
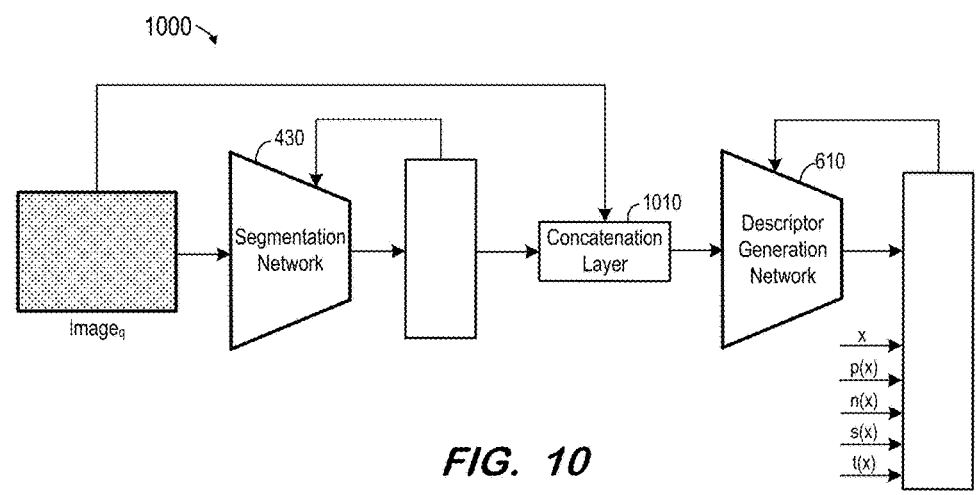
FIG. 10 illustrates fine-tuning of a combined segmentation and representation network according to some embodiments.

According to some embodiments, the combined network receives a segmented image through an additional input channel, as opposed to using segmented images generated by applying the segmentation mask on the input image. System 1000 of FIG. 10 is one implementation of such a combined network, in which concatenation layer 1010 substitutes for element-wise operation 910. Network 610 is trained with two channel inputs (i.e., a two-dimensional depth image and a segmentation mask) instead of the only the two-dimensional depth image.

In some embodiments, system 1000 does not require early decision-making on the segmentation mask, which typically removes the pixels predicted as background from further consideration and therefore is not tolerant to segmentation errors. Rather, system 1000 enables providing segmentation as a likelihood map and allows representation network 610 to capture relevant information jointly from the segmentation map and input image.

Figure 11:
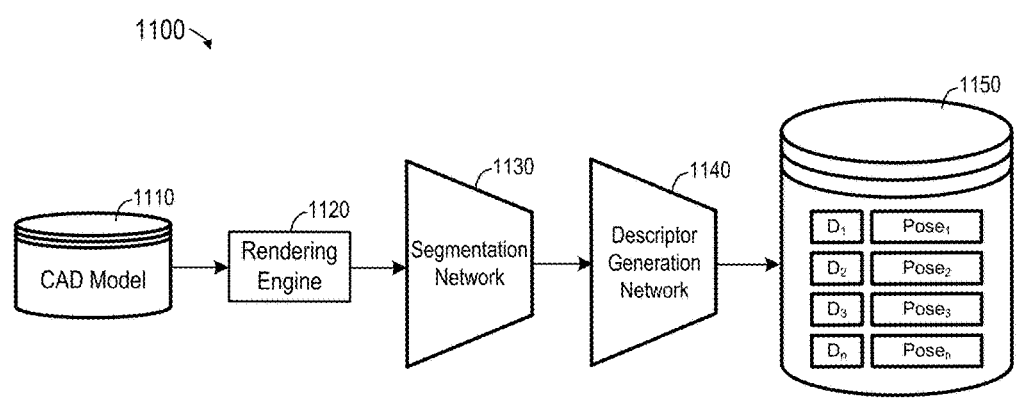
FIG. 11 is a block diagram illustrating generation of a database of poses and corresponding image descriptors according to some embodiments.

FIG. 11 illustrates use of the trained networks to create a camera pose database for use, for example, as described above with respect to FIG. 2. As described above, input data for system 1100 may be generated by rendering two-dimensional depth images from three-dimensional CAD data 1110 of an object which is intended to be imaged using rendering engine 1120. The two-dimensional depth images are segmented by network 1130 and a descriptor is generated therefrom by network 1140. The descriptor generated from an input depth image is stored in database 1150 in association with an indicator of the camera pose of the depth image. Database 1150 may be indexed and subsequently searched by an indexing algorithm based on K-nearest neighbor search or based on an approximated nearest neighbor method. For example, K=5 ranked images may be utilized for reducing a false negative rate. Several candidate camera poses may be presented to a user, who then provides a final selection.

Figure 12:
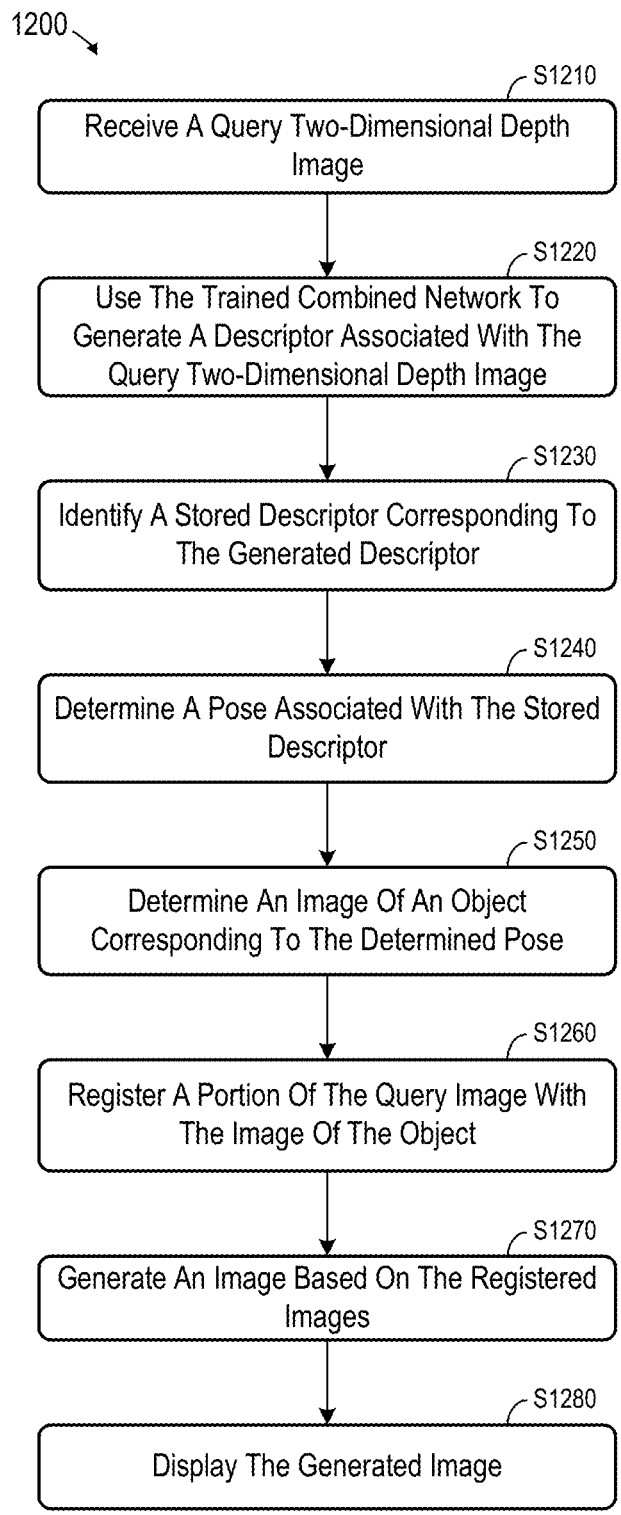
FIG. 12 is a flow diagram of a process to register images according to some embodiments.

FIG. 12 is a flow diagram of process 1200 to utilize a combined trained network as described herein. Process 1200 will be described with respect to system 200 FIG. 2, but embodiments are not limited thereto. Initially, a two-dimensional depth image is acquired at S1210. The two-dimensional depth image may be acquired using a depth camera and the image may represent an examination room, an operating room, an imaging or treatment room, a manufacturing space, or any other suitable scene. The scene may include one or more pieces of equipment in view of which system 200 was trained. For example, if the scene comprises a CT-scanning room, the training data may have included two-dimensional depth images of a CT scanner.

System 200 generates descriptor $D_q$ at S1220 based on the acquired image, segmentation network 110 and descriptor generation network 140. Next, at S1230, a corresponding descriptor of database 150 is identified. According to some embodiments, database 150 may be traversed to find the closest neighbor in a nearest neighbor search method which generates closest matches. A corresponding camera pose is determined for each identified descriptor at S1240. A user or further algorithm may then select a camera pose from the identified matches.

An image of an object which corresponds to the identified camera pose is determined at S1250. S1250 may comprise rendering an image of the object (i.e., an object located in the originally-acquired image) from the viewpoint of the camera pose based on a CAD model of the object. The image may then be registered against the original image at S1260, in order to generate a composite image at S1270 and to display the composite image at S1280.

According to some embodiments, the image determined at S1250 may comprise a two-dimensional map of part labels of an object of interest. For example, the map may be generated based on the determined camera pose and overlaid on the original image to assist a user in identifying parts of the object. The part labels may be selectable and may encode metadata such as an index to a database entry associated with the part.

Some embodiments may be used to identify objects by registration in real time. Such identification may assist in understanding the location and movement of objects during routine processes. Robust identification of objects may assist in collision avoidance or navigation.

Figure 13:
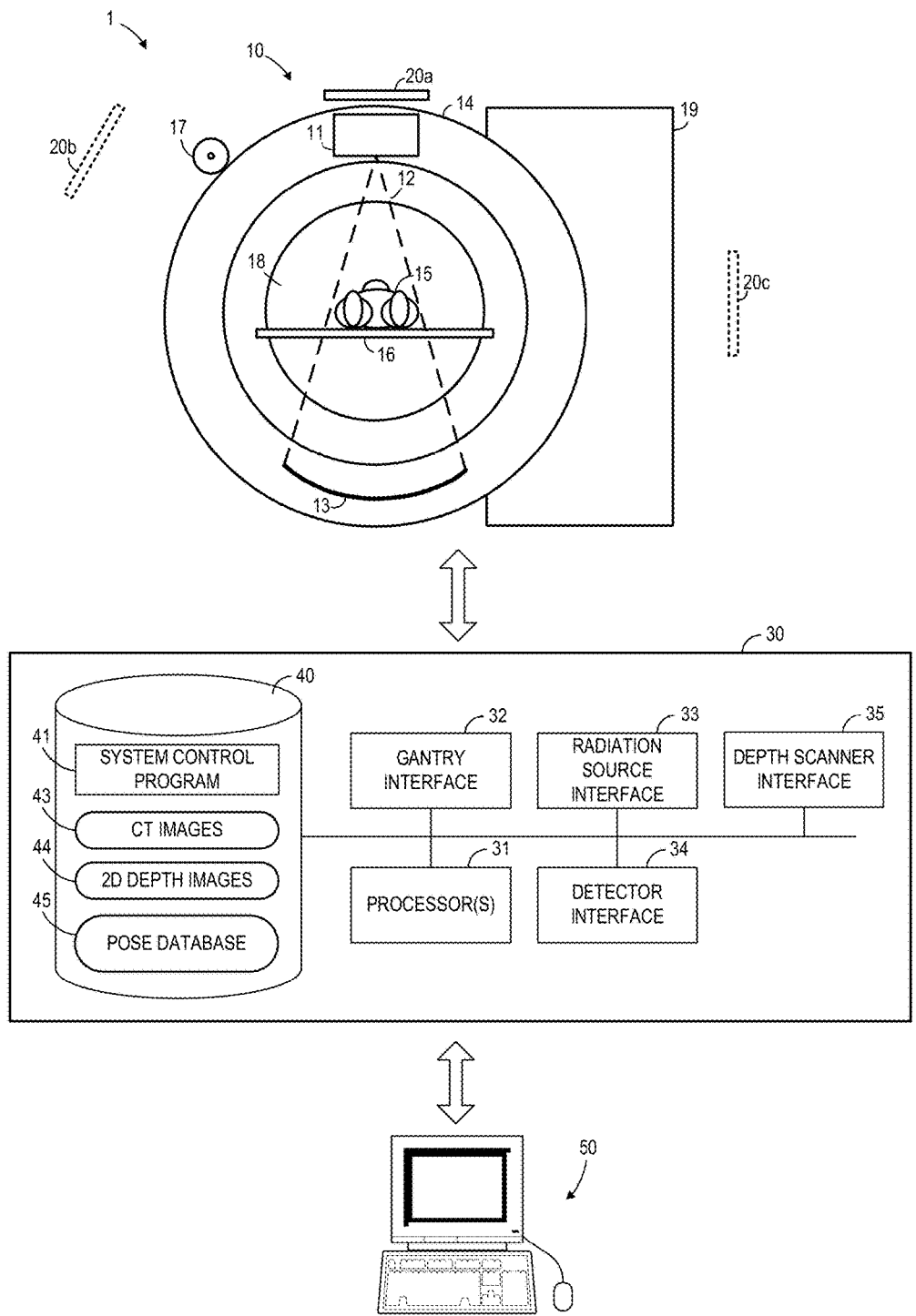
FIG. 13 illustrates a system according to some embodiments.

FIG. 13 illustrates system 1 according to some embodiments. System 1 may be operated to acquire two-dimensional depth images, determine a camera pose and/or register images according to some embodiments. Embodiments are not limited to system 1 to perform either function.

System 1 includes x-ray imaging system 10, scanner 20a, control and processing system 30, and operator terminal 50. According to some embodiments, system 1 includes two or more scanners, and example locations and orientations thereof are illustrated as scanner 20b and scanner 20c.

Generally, and according to some embodiments, X-ray imaging system 10 acquires two-dimensional X-ray images of a patient volume and scanner 20a acquires two-dimensional depth images of a patient. Control and processing system 30 controls X-ray imaging system 10 and scanner 20a, and receives the acquired images therefrom. Control and processing system 30 processes the depth images to determine a camera pose and to register an image against the acquired image as described above. Such images may be presented to a user by terminal 50.

Imaging system 10 comprises a CT scanner including X-ray source 11 for emitting X-ray beam 12 toward opposing radiation detector 13. Embodiments are not limited to CT data or to CT scanners. X-ray source 11 and radiation detector 13 are mounted on gantry 14 such that they may be rotated about a center of rotation of gantry 14 while maintaining the same physical relationship therebetween.

Radiation source 11 may comprise any suitable radiation source, including but not limited to a Gigalix™ x-ray tube. In some embodiments, radiation source 11 emits electron, photon or other type of radiation having energies ranging from 50 to 150 keV. Radiation detector 13 may comprise any system to acquire an image based on received x-ray radiation.

To generate X-ray images, patient 15 is positioned on bed 16 to place a portion of patient 15 between X-ray source 11 and radiation detector 13. Next, X-ray source 11 and radiation detector 13 are moved to various projection angles with respect to patient 15 by using rotation drive 17 to rotate gantry 14 around cavity 18 in which patient 15 is positioned. At each projection angle, X-ray source 11 is powered by high-voltage generator 19 to transmit X-ray radiation 12 toward detector 13. Detector 13 receives the radiation and produces a set of data (i.e., a raw X-ray image) for each projection angle.

Scanner 20a may comprise a depth camera. Scanner 20a may acquire depth images as described above. A depth camera may comprise a structured light-based camera (e.g., Microsoft Kinect or ASUS Xtion), a stereo camera, or a time-of-flight camera (e.g., Creative TOF camera) according to some embodiments.

System 30 may comprise any general-purpose or dedicated computing system. Accordingly, system 30 includes one or more processors 31 configured to execute processor-executable program code to cause system 30 to operate as described herein, and storage device 40 for storing the program code. Storage device 40 may comprise one or more fixed disks, solid-state random access memory, and/or removable media (e.g., a thumb drive) mounted in a corresponding interface (e.g., a USB port).

Storage device 40 stores program code of system control program 41. One or more processors 31 may execute system control program 41 to move gantry 14, to move table 16, to cause radiation source 11 to emit radiation, to control detector 13 to acquire an image, and to control scanner 20 to acquire an image. In this regard, system 30 includes gantry interface 32, radiation source interface 33 and depth scanner interface 35 for communication with corresponding units of system 10.

Two-dimensional X-ray data acquired from system 10 may be stored in data storage device 40 as CT images 43, in DICOM or another data format. Each image 43 may be further associated with details of its acquisition, including but not limited to time of acquisition, imaging plane position and angle, imaging position, radiation source-to-detector distance, patient anatomy imaged, patient position, contrast medium bolus injection profile, x-ray tube voltage, image resolution and radiation dosage. CT images 43 may also include three-dimensional CT images reconstructed from corresponding two-dimensional CT images as is known in the art.

Device 40 also stores two-dimensional depth images 44 acquired by scanner 20. In some embodiments, a two-dimensional depth image 44 may be associated with a set of CT images 42, in that the associated image/frames were acquired at similar times while patient 15 was lying in substantially the same position.

One or more processors 31 may execute system control program 41 to determine a camera pose based on a received image as described above. System control program 41 may therefore implement the trained segmentation and representation networks described above, and may utilize pose database 45 to identify camera poses based on generated descriptors.

Terminal 50 may comprise a display device and an input device coupled to system 30. Terminal 50 may display any of CT images 43, two-dimensional depth images 44, or images registered as described herein, and may receive user input for controlling display of the images, operation of imaging system 10, and/or the processing described herein. In some embodiments, terminal 50 is a separate computing device such as, but not limited to, a desktop computer, a laptop computer, a tablet computer, and a smartphone.

Each of system 10, scanner 20, system 30 and terminal 40 may include other elements which are necessary for the operation thereof, as well as additional elements for providing functions other than those described herein.

According to the illustrated embodiment, system 30 controls the elements of system 10. System 30 also processes images received from system 10. Moreover, system 30 receives input from terminal 50 and provides images to terminal 50. Embodiments are not limited to a single system performing each of these functions. For example, system 10 may be controlled by a dedicated control system, with the acquired frames and images being provided to a separate image processing system over a computer network or via a physical storage medium (e.g., a DVD).

Embodiments are not limited to a CT scanner and a depth scanner as described above with respect to FIG. 13. For example, embodiments may employ any other imaging modalities (e.g., a magnetic resonance scanner, a positron-emission scanner, etc.) for acquiring surface data.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A system comprising:
a data store storing a plurality of first images and a segmentation mask associated with each of the plurality of first images; and
a processor to:
create a combined network comprising an image segmentation network and an image representation network, the combined network to generate an image descriptor based on an input query image;
train the combined network based on a plurality of first images and a segmentation mask associated with each of the plurality of first images;
receive a first input query image;
use the combined network to generate an image descriptor based on the first input query image;
determine a matching image descriptor from a plurality of stored image descriptors;
determine a camera pose associated with the matching image descriptor;
register the first input query image with image data based on the determined camera pose; and
generate a composite image based on the registered first input query image and image data; and
a display to present the composite image
wherein training the combined network comprises:
for each of the plurality of first images:
generation of a generated segmentation mask using the image segmentation network; evaluating a loss function comprising a comparison between the segmentation mask associated with the first image and the generated segmentation mask; and modifying the image segmentation network based on the evaluated loss function; and
generation of an image descriptor based on each generated segmentation mask, evaluating a second loss function based on the image descriptor and on a plurality of descriptors having a known relationship to the first image; and modifying the image representation network based on the evaluated second loss function.

2. A system according to claim 1, wherein the first images and the first input query image are two-dimensional depth images.

3. A system according to claim 1, the processor further to:
prior to training the combined network, train the image segmentation network based on the plurality of first images and the segmentation mask associated with each of the plurality of first images, the image segmentation network to identify a foreground of a segmentation input image; and
prior to training the combined network, train the image representation network based on second images and on differences between camera poses associated with the second images, the image representation network to generate an image descriptor based on a representation input image.

4. A system according to claim 1, wherein generation of an image descriptor based on each generated segmentation mask comprises:
generation of a segmented image based on the generated segmentation mask and the first image; and
generation of an image descriptor based on the segmented image.

5. A system according to claim 1, wherein generation of an image descriptor based on each generated segmentation mask comprises:
concatenation of the generated segmentation mask and the first image; and
generation of the image descriptor based on the concatenated generated segmentation mask and first image.

6. A method, comprising:
creating a combined network comprising an image segmentation network to segment an image and an image representation network to generate an image descriptor based on an image;
training the combined network based on a plurality of first images, a segmentation mask associated with each of the plurality of first images, and a plurality of image descriptors of the first images;
receiving a first input query image; and
using the combined network to generate an image descriptor based on the first input query image
wherein training the combined network comprises:
for each of the plurality of first images:
generating a generated segmentation mask using the image segmentation network; evaluating a loss function comprising a comparison between the segmentation mask associated with the first image and the generated segmentation mask; and modifying the image segmentation network based on the evaluated loss function; and
generating an image descriptor based on each generated segmentation mask, evaluating a second loss function based on the image descriptor and on a plurality of descriptors having a known relationship to the first image; and modifying the image representation network based on the evaluated second loss function.

7. A method according to claim 6, further comprising:
determining a matching image descriptor from a plurality of stored image representations;
determining a camera pose associated with the matching image descriptor;
registering the first input query image with image data based on the determined camera pose;
generating a composite image based on the registered first input query image and image data; and
presenting the composite image.

8. A method according to claim 6, wherein the first images and the first input query image are two-dimensional depth images.

9. A method according to claim 6, further comprising:
prior to training the combined network, training the image segmentation network based on the plurality of first images and the segmentation mask associated with each of the plurality of first images, the image segmentation network to identify a foreground of a segmentation input image; and
prior to training the combined network, training the image representation network based on second images and on differences between camera poses associated with the second images, the image representation network to generate an image descriptor based on a representation input image.

10. A method according to claim 6, wherein generating an image descriptor based on each generated segmentation mask comprises:
generating a segmented image based on the generated segmentation mask and the first image; and
generating an image descriptor based on the segmented image.

11. A non-transitory computer-readable medium storing processor-executable process steps, the process steps executable by a processor to cause a system to:
- train an image segmentation network based on a plurality of first images and a segmentation mask associated with each of the plurality of first images, the image segmentation network to identify a foreground of a segmentation input image;
- train an image representation network based on second images and on differences between camera poses associated with the second images, the image representation network to generate an image descriptor based on a representation input image;
- create a combined network comprising the image segmentation network and the image representation network;
- train the image segmentation network and the image representation network of the combined network substantially simultaneously based on the plurality of first images, the segmentation mask associated with each of the plurality of first images, and a plurality of image descriptors of the first images;
- receive a first input query image; and
- use the combined network to generate an image descriptor based on the first input query image wherein training the combined network comprises:
for each of the plurality of first images:
- generating a generated segmentation mask using the image segmentation network;
- evaluating a loss function comprising a comparison between the segmentation mask associated with the first image and the generated segmentation mask; and modifying the image segmentation network based on the evaluated loss function; and
- generating an image descriptor based on each generated segmentation mask, evaluating a second loss function based on the image descriptor and on a plurality of descriptors having a known relationship to the first image; and modifying the image representation network based on the evaluated second loss function.

12. A medium according to claim 11, the process steps executable by a processor to cause a system to:
- determine a matching image descriptor from a plurality of stored image representations;
- determine a camera pose associated with the matching image descriptor;
- register the first input query image with image data based on the determined camera pose;
- generate a composite image based on the registered first input query image and image data; and
- present the composite image.

13. A medium according to claim 11, wherein the first images and the first input query image are two-dimensional depth images.

14. A medium according to claim 11, wherein generating an image descriptor based on each generated segmentation mask comprises:
- generating a segmented image based on the generated segmentation mask and the first image; and
- generating an image descriptor based on the segmented image.

* * * * *